US012730036B2

(12) United States Patent
Zhang et al.

(10) Patent No.: US 12,730,036 B2
(45) Date of Patent: Sep. 8, 2026

(54) CORDLESS SPRING-SYSTEM CURTAIN INSPECTION DEVICE

(71) Applicant: Mingyang Windeco Technology Corporation, Zhengzhou (CN)

(72) Inventors: Nianqing Zhang, Zhengzhou (CN); Pengyu Yang, Zhengzhou (CN); Yongqing Kang, Zhengzhou (CN)

(73) Assignee: Mingyang Windeco Technology Corporation, Zhengzhou (CN)

( * ) Notice: Subject to any disclaimer, the term of this patent is extended or adjusted under 35 U.S.C. 154(b) by 265 days.

(21) Appl. No.: 18/514,137

(22) Filed: Nov. 20, 2023

(65) Prior Publication Data

US 2025/0027845 A1 Jan. 23, 2025

(30) Foreign Application Priority Data

Jul. 19, 2023 (CN) ........................ 202321905848.X

(51) Int. Cl.
*G01M 99/00* (2011.01)
*E06B 9/32* (2006.01)

(52) U.S. Cl.
CPC ............. *G01M 99/001* (2013.01); *E06B 9/32* (2013.01)

(58) Field of Classification Search
CPC ...... G01M 99/001; G01M 99/008; E06B 9/32
See application file for complete search history.

(56) References Cited

U.S. PATENT DOCUMENTS 10,731,410 B2 * 8/2020 Teuscher ................. E06B 9/367

FOREIGN PATENT DOCUMENTS

| | | | | | |
|---|---|---|---|---|---|
| CN | 209356172 | U | * | 9/2019 | |
| CN | 221765283 | U | * | 9/2024 | |
| CN | 119334609 | A | * | 1/2025 | .......... G01M 99/005 |
| DE | 19510431 | C1 | * | 10/1995 | ............. E06B 9/262 |
| DE | 102023133174 | A1 | * | 1/2025 | .......... G01M 99/005 |

* cited by examiner

*Primary Examiner* — Octavia Hollington
(74) *Attorney, Agent, or Firm* — HSML P.C.

(57) ABSTRACT

A cordless spring-system curtain inspection device, comprising a test stand and a curtain-opening and -closing drive mechanism disposed on the test stand, wherein the curtain-opening and -closing drive mechanism comprises a clamping mechanism configured to clamp a lower beam of a curtain and a lower-beam lifting drive mechanism configured to drive the clamping mechanism to move reciprocally and linearly. The utility model is applicable to various cordless spring-system curtains, having a wide application range. The clamped member can be fixed to the clamping apparatus by adding an auxiliary component to the lower beam. The lifting parts in the utility model are all driven by the stepmotor or servo motor, and the slide rail and transmission belts are provided. The curtain height is measured more precise, the force during curtain inspection is more stable, and the test data is more accurate.

8 Claims, 5 Drawing Sheets

CORDLESS SPRING-SYSTEM CURTAIN INSPECTION DEVICE

FIELD OF THE INVENTION

The utility model pertains to the field of cordless curtains, and in particular to, a cordless spring-system curtain inspection device.

BACKGROUND OF THE INVENTION

As society develops, the styles and functions of curtain products are continuously improved and perfected in response to people's needs. In recent years, because bead or corded curtain systems are likely to cause potential risks to children in daily life, the electric curtain system has been quite expensive, making it difficult for widespread application. At this stage, multiple curtain systems controlled with springs have been designed to avoid the potential risks caused by cords and bead chains, and are far cheaper than the electric curtains, showing significant market competitiveness. However, there is no complete device for inspecting this series of products, and most of the inspections are done manually, where the curtain is controlled to open or close by pulling the lower beam. When there are too many inspection cycles, operators need to frequently bend over, so as to pull the curtains, which is time-consuming and labor-intensive. Moreover, the data feedback is not precise enough, and it is heavily influenced by human factors, making it likely to cause production anomalies and other issues.

The patent CN209356172U has disclosed a comprehensive apparatus for inspecting venetian blinds. This apparatus is provided with inspecting mechanisms for curtains with cords or bead chains, lacking inspection means for cordless spring curtains and unable to test the force acting on cordless curtains or other situations.

SUMMARY

The utility model provides a cordless spring-system curtain inspection device.

The objective of the utility model is achieved in the following manner.

A cordless spring-system curtain inspection device, comprising a test stand and a curtain-opening and -closing drive mechanism disposed on the test stand, wherein the curtain-opening and -closing drive mechanism comprises a clamping mechanism configured to clamp a lower beam of a curtain and a lower-beam lifting drive mechanism configured to drive the clamping mechanism to move reciprocally and linearly.

The clamping mechanism is disposed on a clamping sliding platform to be driven by the lower-beam lifting drive mechanism for linear movement; the clamping mechanism comprises a first clamping member and a second clamping member that are disposed on the clamping sliding platform, the first clamping member and the second clamping member forming a clamping groove; the clamping groove is driven by a clamping drive mechanism disposed on the clamping sliding platform to be contracted or opened, so as to open or close the clamping mechanism; the clamping mechanism is provided with a lower-beam position-inspecting mechanism configured to inspect whether the lower beam is in place; and the curtain-opening and -closing drive mechanism is electrically connected to a programmable logic controller (PLC).

The clamping sliding platform is fixed to a tension sensor, wherein an upper end of the tension sensor is fixedly connected to a clamping mounting plate; the first clamping member, the second clamping member, and the clamping drive mechanism are disposed on the clamping mounting plate; and the tension sensor is electrically connected to the PLC.

Two sides of the clamping mounting plate are each fixed to a downward support plate, the clamping sliding platform comprises a sliding bottom plate, the sliding bottom plate is provided with two vertical plates respectively corresponding to the support plates, and the support plate is connected to the vertical plate via a guide assembly.

The lower-beam position-inspecting mechanism comprises an infrared sensor disposed above the clamping groove; a transmission end and a reception end of the infrared sensor are respectively mounted on sensor mounting brackets on two sides of the clamping groove; the sensor mounting bracket is disposed on the vertical plate and adjustable with the vertical plate in vertical position, so as to adjust height of the infrared sensor; and an upper surface of the clamping drive mechanism is fixed to a top mounting plate, and the position of the top mounting plate corresponding to the clamping groove is provided with an avoidance hole allowing a clamped member on the lower beam of the curtain to enter the clamping groove below.

The lower-beam lifting drive mechanism comprises a clamping lifting stepmotor disposed on the test stand, the clamping lifting stepmotor drives a clamping synchronization-belt wheel disposed on the test stand to rotate, and the clamping synchronization-belt wheel drives a clamping synchronization belt to move up and down; the clamping synchronization belt is fixed to a clamping synchronization block, and the clamping sliding platform is fixed to the clamping synchronization block; and the clamping lifting stepmotor is electrically connected to the PLC.

The test stand is provided with an upper beam configured to connect a curtain mounting frame at an upper end of the curtain, and the upper beam is driven by an upper-beam lifting drive mechanism on the test stand to ascend and descend on the test stand.

The upper-beam lifting drive mechanism comprises a lifting servo motor disposed on the test stand, the lifting servo motor drives an output shaft to rotate, upper synchronization-belt wheels are respectively disposed at two ends of the output shaft, and each upper synchronization-belt wheel drives, via a synchronization belt, a lower synchronization-belt wheel below to rotate; the synchronization belts on two sides are respectively fixed to synchronization blocks, and two ends of the lower beam are respectively fixed to the synchronization blocks; two sides of the test stand are each further provided with an upper-beam lifting guide rail, and the synchronization block is slidably disposed on the upper-beam lifting guide rail; and highest and lowest positions of the test stand corresponding to the synchronization blocks are each provided with a limiter.

The test stand is provided with a touchscreen control panel, and the touchscreen control panel is electrically connected to the PLC.

Compared with the related art, the utility model is applicable to various cordless spring-system curtains, having a wide application range. The clamped member can be fixed to the clamping apparatus by adding an auxiliary component to the lower beam. The lifting parts in the utility model are all driven by the stepmotor or servo motor, and the slide rail and transmission belts are provided. The curtain height is measured more precise, the force during curtain inspection is more stable, and the test data is more accurate. In addition, when the clamping mechanism in the utility model pulls the lower beam of the curtain to ascend or descend, the lifting speed can be adjusted to simulate the speed at which the curtain is pulled down manually, and the performance change of the curtain in different states of the curtain is inspected. The real-time tension can be measured by section when the curtain is pulled down to detect changes in spring tension.

Figure 1:
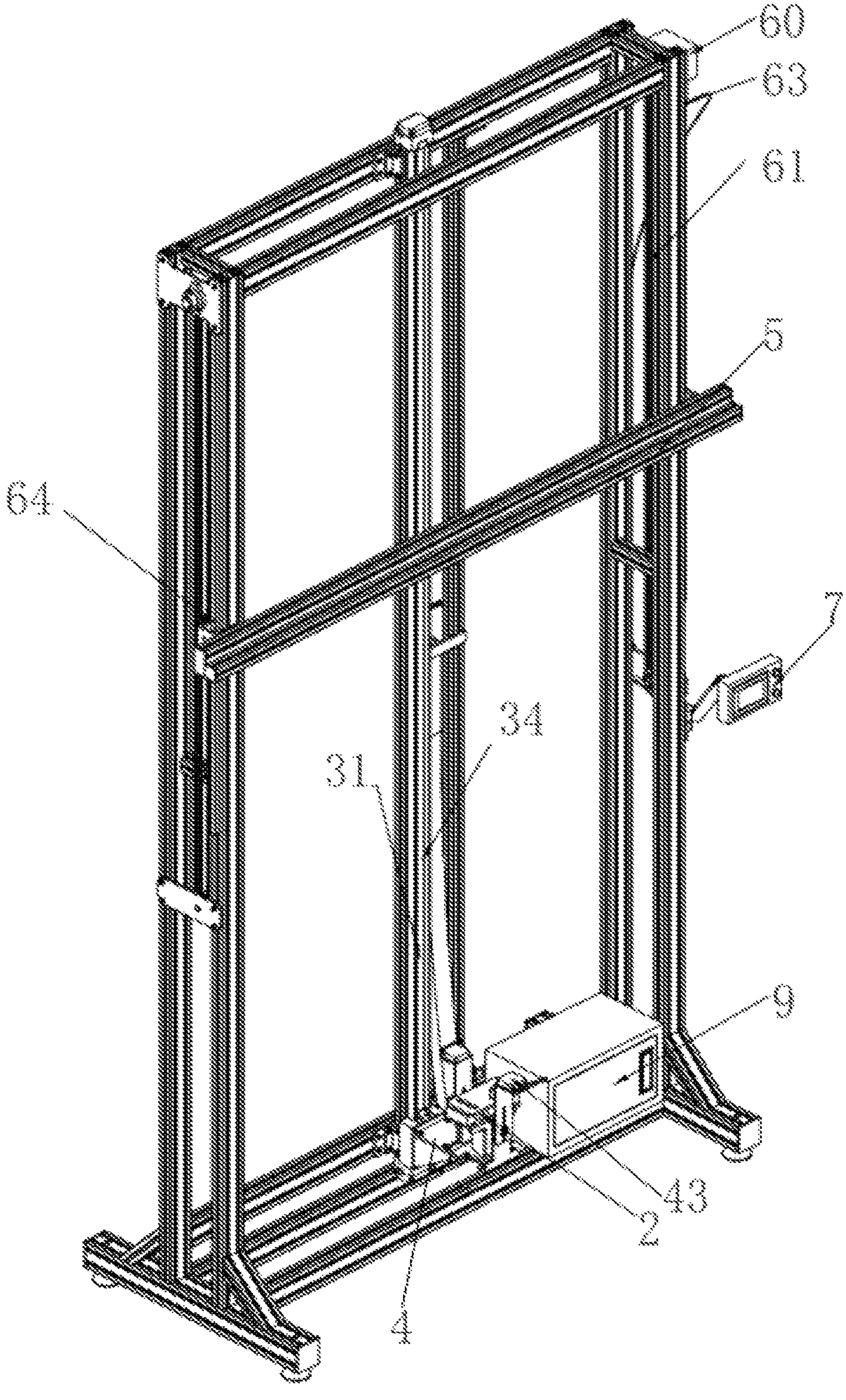
FIG. 1 is a schematic diagram of an axis side of the utility model.

Numeral references are as follows: 1. test stand, 2. clamping mechanism, 20. first clamping member, 21. second clamping member, 23. clamping drive mechanism, 24. clamping mounting plate, 25. support plate, 26. top mounting plate, 27. avoidance hole, 3. lower-beam lifting drive mechanism, 30. clamping lifting stepmotor, 31. clamping synchronization belt, 32. clamping synchronization block, 33. support guide block, 34. clamping lifting guide rail, 4. clamping sliding platform, 40. sliding bottom plate, 41. vertical plate, 42. guide assembly, 43. infrared sensor, 44. sensor mounting bracket, 5. upper beam, 6. upper-beam lifting drive mechanism, 60. lifting servo motor, 61. synchronization belt, 62. synchronization block, 63. limiter, 64. upper-beam lifting guide rail, 7. touchscreen control panel, 8. tension sensor, and 9. PLC.

EMBODIMENTS

In the utility model, unless otherwise explicitly specified and limited, the technical terms used in this application should be understood in their common sense by those skilled in the art. The terms "connect", "join", "fix", "dispose", and the like should be understood in their general senses. They may refer to a fixed connection, a detachable connection, or an integral connection; may refer to a direct connection or an indirect connection via an intermediate medium; and may refer to a mechanical connection or electrical connection. Unless otherwise explicitly specified and limited, that the first feature is "above" or "below" the second feature may mean direct contact between the first and second features or indirect contact through an intermediate medium. Moreover, that the first feature is "on", "above", or "on top of" the second feature may mean that the first feature is directly or obliquely above the second feature, or only means that the level of the first feature is higher than the level of the second feature. That the first feature is "under", "below", or "beneath" the second feature may mean that the first feature is directly or obliquely below the second feature, or only means that the level of the first feature is lower than the level of the second feature. Terms such as first and second are merely used to distinguish one entity or operation from another entity or operation without necessarily requiring or implying any actual such relationship or order between such entities or operations. Terms used in the description, such as "center", "transverse", "longitudinal", "length", "width", "thickness", "height", "front", "rear", "left", "right", "above", "below", "vertical", "horizontal", "top", "bottom", "inside", "outside", "axial", "radial", "circumferential", "clockwise", and "counterclockwise", indicate azimuthal or positional relations on the basis of those shown in the drawings only for ease of description of the utility model and for simplicity of description, and are not intended to indicate or imply that the referenced apparatus or element must have a particular orientation and be constructed and operative in a particular orientation.

Figure 2:
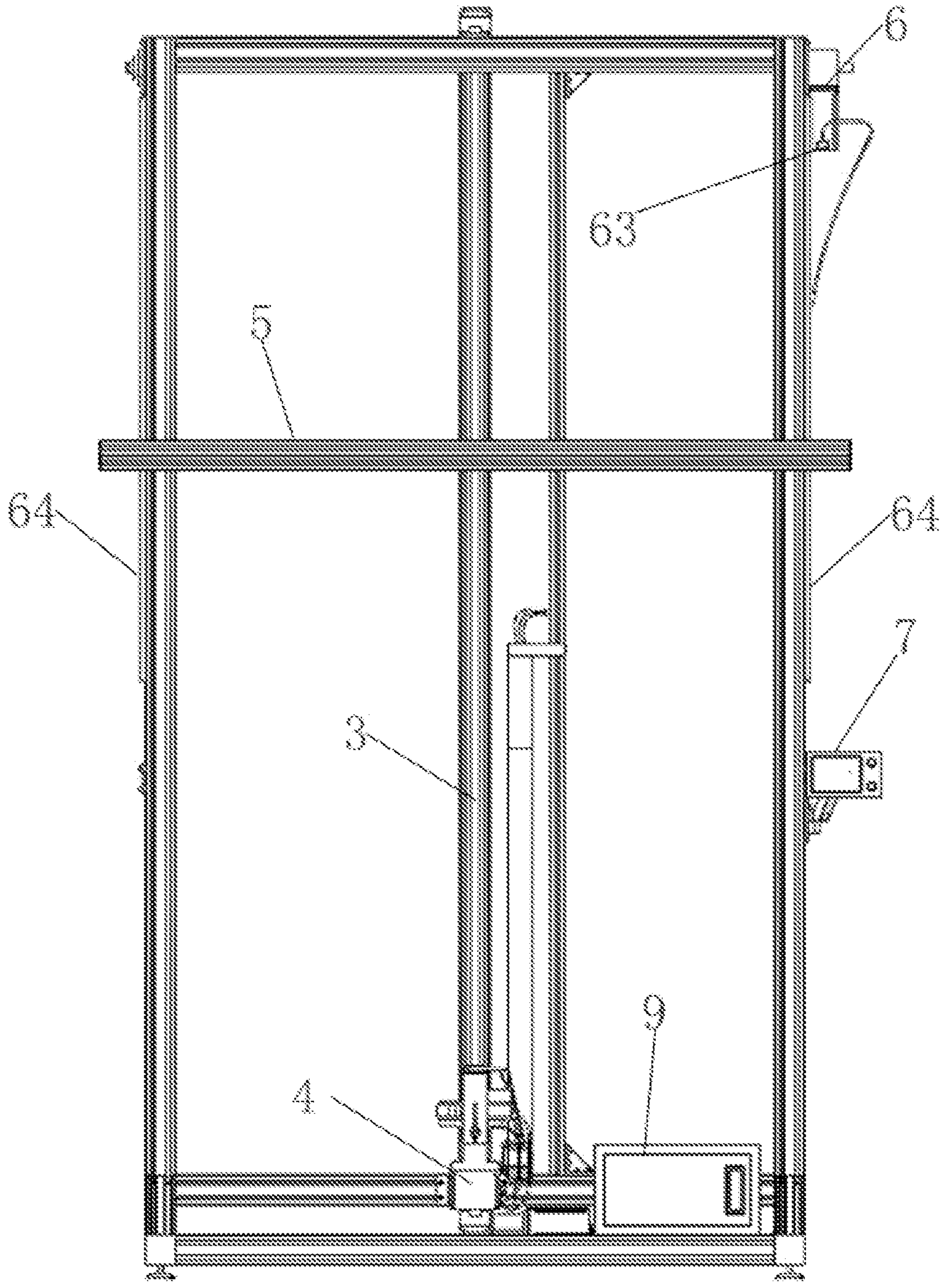
FIG. 2 is a front view of the utility model.
Figure 3:
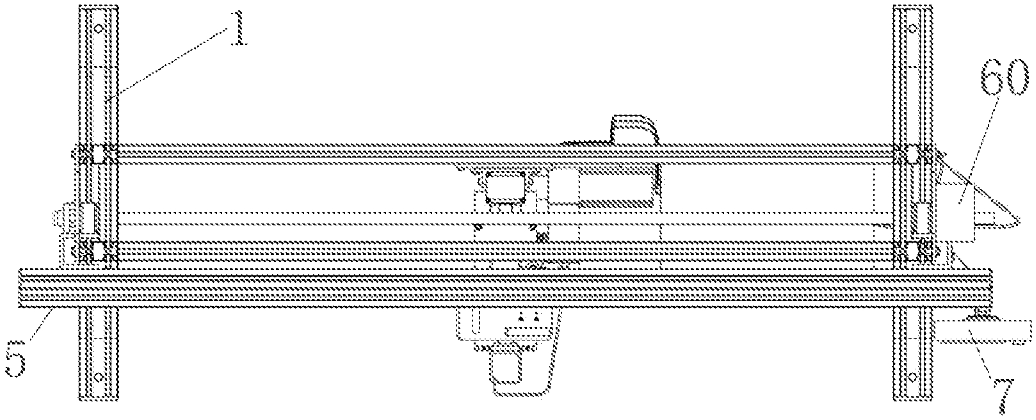
FIG. 3 is a top view of the utility model.
Figure 4:
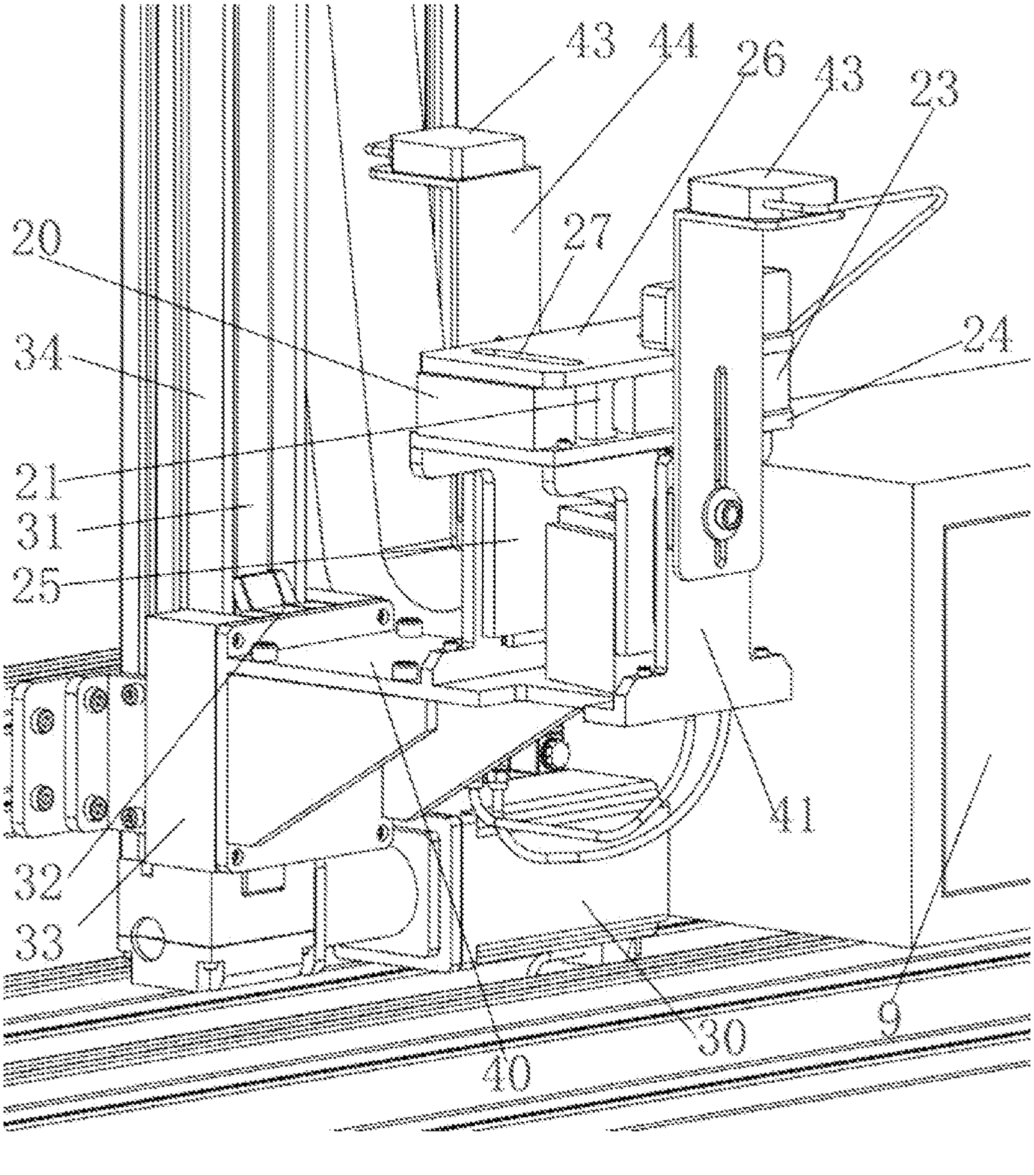
FIG. 4 is partially enlarged diagram of a clamping mechanism and a clamping sliding platform.
Figure 5:
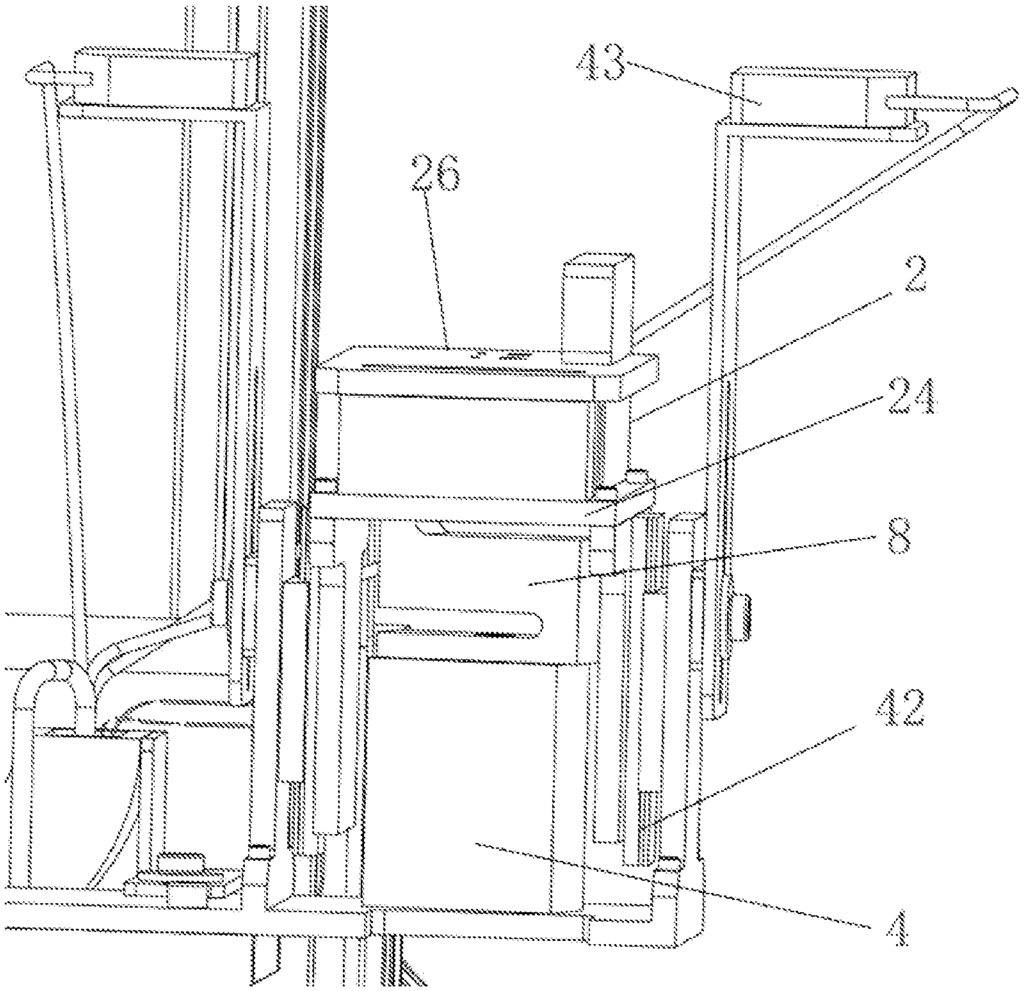
FIG. 5 is a three-dimensional diagram of FIG. 4 in another direction.
Figure 6:
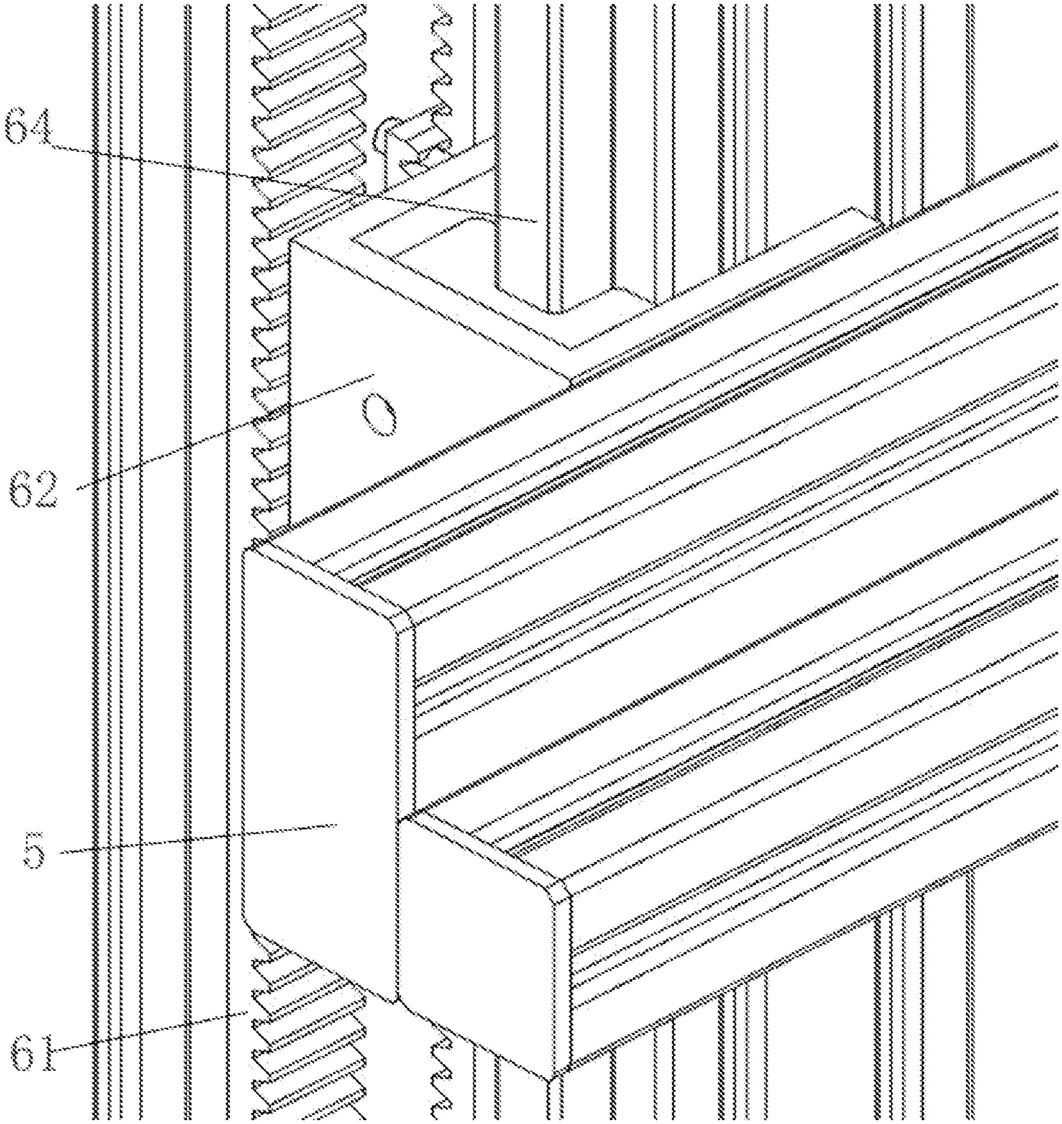
FIG. 6 is a partially enlarged view of an upper beam and a synchronization belt.

With reference to the accompanying drawings as well as specific embodiments, the technical solutions of the utility model will be clearly and completely described as follows. As shown in FIGS. 1 to 6, a cordless spring-system curtain inspection device is provided, including a test stand 1 and a curtain-opening and -closing drive mechanism disposed on the test stand 1. The curtain-opening and -closing drive mechanism includes a clamping mechanism 2 configured to clamp a lower beam of the curtain and a lower-beam lifting drive mechanism 3 configured to drive the clamping mechanism 2 to move reciprocally and linearly.

The curtain-opening and -closing drive mechanism is electrically connected to a PLC 9. The driving elements in the curtain-opening and -closing drive mechanism are electrically connected to the controller, which is configured for automatic control and measuring and recording data. The utility model can inspect cordless spring-system curtains.

The clamping mechanism 2 is disposed on a clamping sliding platform 4 to be driven by the lower-beam lifting drive mechanism 3 for linear movement; the clamping mechanism 2 includes a first clamping member 20 and a second clamping member 21 that are disposed on the clamping sliding platform 4, the first clamping member 20 and the second clamping member 21 forming a clamping groove; the clamping groove is driven by a clamping drive mechanism 23 disposed on the clamping sliding platform 4 to be contracted or opened, so as to open or close the clamping mechanism 2; and the clamping mechanism 2 is provided with a lower-beam position-inspecting mechanism configured to inspect whether the lower beam is in place. There can be multiple types of clamping drive mechanisms 23, for example, the conventional linear drive mechanism such as the air cylinder. The clamping drive mechanism 23 can drive the first clamping member 20 or the second clamping member 21 to move linearly for clamping, so as to complete opening or closing. For example, in the structure shown in the figure, the clamping drive mechanism 23 is an air cylinder with a moving end connected to the second clamping member 21. The second clamping member 21 moves to allow the clamping mechanism 2 to clamp or unclamp. Alternatively, the first clamping member 20 and the second clamping member 21 are driven to move simultaneously. The conventional bidirectional clamping mechanism such as the double-ended pneumatic cylinder mechanism and the double-ended clamping mechanism is used. The clamping drive mechanism 23 is electrically connected to a PLC 9. The lower-beam position-inspecting mechanism can inspect whether the lower beam is automatically in place, thus completing automatic control. The lower-beam position-inspecting mechanism and the clamping drive mechanism 23 are electrically connected to the controller, thus completing the automatic inspection and control. The lower-beam position-inspecting mechanism may be the conventionally and commonly used in-place sensor or position sensor, such as a laser sensor, an infrared sensor 43, and the like. The lower-beam position-inspecting mechanism is electrically connected to the PLC 9. The clamping groove may be used for directly clamping the lower beam of the curtain. Alternatively, the clamped member may be fixed to or suspended on the lower beam of the curtain to be clamped in the clamping groove, so as to fix the lower beam of the curtain. The clamped member may be a rope or a member to be clamped easily such as a hard plate or block.

The clamping sliding platform 4 is fixed to a tension sensor 8. An upper end of the tension sensor 8 is fixedly connected to a clamping mounting plate 24; the first clamping member 20, the second clamping member 21, and the clamping drive mechanism 23 are disposed on the clamping mounting plate 24; and the tension sensor 8 is electrically connected to the PLC 9. When the clamping mechanism 2 moves up and down to pull the curtain to be opened and closed, the tension acting on the clamping mechanism 2 is transferred to the tension sensor 8, and then the tension sensor 8 transfers, via the PLC 9, the inspected tension to the touchscreen control panel for displaying.

Two sides of the clamping mounting plate 24 are each fixed to a downward support plate 25, the clamping sliding platform 4 includes a sliding bottom plate 40, the sliding bottom plate 40 is provided with two vertical plates 41 respectively corresponding to the support plates 25, and the support plate 25 is connected to the vertical plate 41 via a guide assembly 42. The guide assembly 42 may be a guide-rail sliding-block mechanism, a sliding-groove sliding-block mechanism, or another mechanism. The provision of the guide assembly 42 can ensure that after the clamping mechanism 2 is subjected to the tension of the curtain, its position does not deviate. A certain deviation is allowed between the clamping mechanism 2 and the clamping sliding platform 4, thus ensuring the tension sensor 8 accurately shows the tension.

The lower-beam position-inspecting mechanism includes an infrared sensor 43 disposed above the clamping groove; a transmission end and a reception end of the infrared sensor 43 are respectively mounted on sensor mounting brackets 44 on two sides of the clamping groove; the sensor mounting bracket 44 is disposed on the vertical plate 41 and adjustable with the vertical plate 41 in vertical position, so as to adjust height of the infrared sensor 43; and an upper surface of the clamping drive mechanism 23 is fixed to a top mounting plate 26, and the position of the top mounting plate 26 corresponding to the clamping groove is provided with an avoidance hole 27 allowing a clamped member on the lower beam of the curtain to enter the clamping groove below. The sensor mounting bracket 44 is provided with a long hole, and the vertical plate 41 is provided with a threaded through hole. The combination between the long hole and the threaded through hole helps to adjust the height pf the sensor mounting bracket 44. The top mounting plate 26 can fix and protect the clamping drive mechanism, that is, the air cylinder 23. The top mounting plate 26 is located above the clamping groove to avoid the external items entering the clamping groove. When the lower beam of the curtain enters a space between the transmission end and the reception end of the infrared sensor 43, the infrared sensor 43 receives a signal, and transfers, via the PC controller, the signal to the clamping drive mechanism 23 such as the air cylinder for starting, so as to clamp the member on the lower beam of the curtain. After the clamping mechanism 2 unclamps the member, the inspection can be automatically stopped.

The lower-beam lifting drive mechanism 3 includes a clamping lifting stepmotor 30 disposed on the test stand 1, the clamping lifting stepmotor 30 drives a clamping synchronization-belt 31 wheel disposed on the test stand 1 to rotate, and the clamping synchronization-belt 31 wheel drives a clamping synchronization belt 31 to move up and down; and the clamping synchronization belt 31 is fixed to a clamping synchronization block 32, and the clamping sliding platform 4 is fixed to the clamping synchronization block 32. Support guide blocks 33 are respectively disposed on two sides of the clamping synchronization block 32 on the clamping sliding platform 4, and clamping lifting guide rails 34 are respectively disposed on two sides of the synchronization belt on a support frame. The two clamping lifting guide rails 34 are located on the inner sides of the two support guide blocks 33 for guiding, so as to prevent the clamping sliding platform 4 from deviating during lifting. The clamping lifting stepmotor 30 is electrically connected to the PLC 9, thus completing lifting.

The test stand 1 is provided with an upper beam 5 configured to connect and fix the curtain mounting frame at the upper end of the curtain, and the upper beam 5 is driven by the upper-beam lifting drive mechanism 6 disposed on the test stand 1 to ascend or descend on the test stand 1. The upper-beam lifting drive mechanism 6 may be a conventional linear drive mechanism. The upper beam 5 may be disposed with multiple bolts that can be moved horizontally, so as to fix the curtain mounting frame. The lifting of the upper beam 5 is used for conveniently mounting and hanging the curtain. In the utility model, it is simple and convenient to mount the curtain using, for example, an L-shaped mounting frame, and the upper beam 5 ascends or descends to drive the overall lifting of the curtain, thus arbitrarily setting the hanging height of the curtain. The upper beam 5 may be further provided with a hook according to requirements or another component or mechanism configured to fix and hang the upper end of the curtain.

The upper-beam lifting drive mechanism 6 includes a lifting servo motor 60 disposed on the test stand 1, the lifting servo motor 60 drives an output shaft to rotate, upper synchronization-belt 61 wheels are respectively disposed at two ends of the output shaft, and each upper synchronization-belt 61 wheel drives, via the synchronization belt 61, a lower synchronization-belt 61 wheel below to rotate; the synchronization belts 61 on two sides are respectively fixed to synchronization blocks 62, and two ends of the lower beam are respectively fixed to the synchronization blocks 62; two sides of the test stand 1 are each further provided with an upper-beam lifting guide rail 64, and the synchronization block 62 is slidably disposed on the upper-beam lifting guide rail 64; and highest and lowest positions of the test stand 1 corresponding to the synchronization blocks 62 are each provided with a limiter 63. The limiter 63 may be a position sensor or a limiting switch. The limiter 63 is electrically connected to the PLC. The test stand 1 may be of a frame structure and is constructed using a section bar or another material. The output shaft is disposed at the top end of the test stand 1. Of the synchronization block 62, one side is fixed to the upper beam 5, the other side is fixed to the synchronization belt 61, and the middle part is provided with a guide groove to match the upper-beam lifting guide rail 64. Certainly, another conventional drive mechanism such a stepmotor may be also used herein.

The test stand is provided with a touchscreen control panel, and the touchscreen control panel is electrically connected to the PLC. The lifting servo motor 60 and another automatically controlled mechanism present in the specification may be both electrically connected to the PLC 9, and controlled using the touchscreen control panel 7. The touchscreen control panel 7 is provided with a start button and a stop button for emergency and other settings for parameters such as speed. Electrical connection among the touchscreen control panel, the servo motor, the PLC 9, the air cylinder, the linear drive mechanism, the control appliance, and signal transfer pertain to the related, and thus details are not described herein again.

In detailed embodiment, the control panel controls the upper beam 5 to ascend or descend to a proper position for hanging the curtain. A signal carrying instruction is transferred by the touchscreen control panel to the PLC 9 and then to the lifting servo motor 60, so as to drive the synchronization belts 61 on two sides to drive the upper beam 5 to ascend or descend along the upper-beam lifting guide rail 64. The touchscreen control panel 7 can send an instruction to the lifting servo motor 60, so as to adjust the lifting speed of the upper beam 5. The curtain mounting frame is hanged on the upper beam 5, and the upper beam 5 drives the curtain to ascend to a proper position. The highest and lowest positions of the upper beam 5 are respectively provided with limiters 63, so as to limit the movement of the upper beam 5. When the lower beam of the curtain enters the space between the transmission end and the reception end of the infrared sensor 43 *a*, the infrared sensor 43 receives the signal, and transfers, via the PLC 9, the signal to the clamping drive mechanism 23 such as the air cylinder for starting, so as to clamp the member on the lower beam of the curtain.

When the inspection starts, the touchscreen control panel 7 may transmit the signal to the PLC 9, and the PLC 9 controls the lifting servo motor 60 to start, so as to drive the belt 41 to move up and down, thus opening or closing the curtain. In the utility model, during operation, the touchscreen control panel sends a signal carrying instruction to the PLC, and the PLC transmits the signal to the clamping lifting stepmotor 30, so as to control the speed of the clamping synchronization belt 32 and the interval time between ascending and descending. When the curtain is pulled down for inspection, the touchscreen control panel 7 can inspect the tension change via the tension sensor 8 in real time, or may set the parameter to tension data of multiple points for inspection during pulling down. For example, pieces of data are recorded and stored in a case of pulling down to 0.5 m, 1 m, 1.5 m, or the like, respectively. During tension measurement by section, the position from which the entire lower beam of the curtain is normally extracted is taken as a start point for arranging section points. After the curtain is pulled to a point, the tension at the point is recorded, and then the curtain is pulled to the next point, where a time interval may be set. During the inspection on the curtain, the signal may be edited and transmitted by the touchscreen control panel 7 to the PLC 9, and the PLC 9 controls the rotation speed of the lifting servo motor 60. The rotation speed can be changed to inspect the overall function change of the curtain at different retracting speeds, so as to adapt to various speed changes during pulling down during the daily use of curtain.

The inspection device of the utility model has the following advantages: The utility model is applicable to various cordless spring-system curtains, such as cordless sheer curtains, cordless roller blinds, cordless honeycomb blinds, thus having a wide application range. The clamped member can be fixed to the clamping apparatus by adding an auxiliary component to the lower beam. The lifting parts in the utility model are all driven by the stepmotor or servo motor, and the slide rail and transmission belts are provided. The curtain height is measured more precise, the force during curtain inspection is more stable, and the test data is more accurate. In addition, when the clamping mechanism in the utility model pulls the lower beam of the curtain to ascend or descend, the lifting speed can be adjusted to simulate the speed at which the curtain is pulled down manually, and the performance change of the curtain in different states of the curtain is inspected. The real-time tension can be measured by section when the curtain is pulled down to detect changes in spring tension. The PLC in the utility model can store data. After batch testing, the additional counterweight weight required for the lower beam can be determined, avoiding waste due to excessive counterweight or abnormalities in curtain production due to insufficient counterweight. The inspection device of the utility model is mounted with a limiter, where exceeding the range causes automatic stop. In case of an abnormality during the inspection, the stop button for emergency on the control panel can be pressed, making the curtain inspection device safe and reliable.

Various technical features of the foregoing embodiments can be combined in any way, provided that the combinations of these technical features do not contradict each other, they should all be considered within the scope as described in this specification. On the premise of not departing from the overall concept of the utility model, the equivalent replacement or change according to the technical solution of the utility model, and a number of changes and improvements should also be considered within the scope of protection of the utility model.

The invention claimed is:

1. A cordless spring-system curtain inspection device, comprising:

a test stand and a curtain-opening and-closing drive mechanism disposed on the test stand, wherein the curtain-opening and-closing drive mechanism comprises a clamping mechanism configured to clamp a lower beam of a curtain and a lower-beam lifting drive mechanism configured to drive the clamping mechanism to move reciprocally and linearly, wherein the clamping mechanism is disposed on a clamping sliding platform to be driven by the lower-beam lifting drive mechanism for linear movement; the clamping mechanism comprises a first clamping member and a second clamping member that are disposed on the clamping sliding platform, the first clamping member and the second clamping member forming a clamping groove; the clamping groove is driven by a clamping drive mechanism disposed on the clamping sliding platform to be contracted or opened, so as to open or close the clamping mechanism; the clamping mechanism is provided with a lower-beam position-inspecting mechanism configured to inspect whether the lower beam is in place; and the curtain-opening and-closing drive mechanism is electrically connected to a programmable logic controller (PLC).

2. The cordless spring-system curtain inspection device according to claim 1, wherein the clamping sliding platform is fixed to a tension sensor, wherein an upper end of the tension sensor is fixedly connected to a clamping mounting plate; the first clamping member, the second clamping member, and the clamping drive mechanism are disposed on the clamping mounting plate; and the tension sensor is electrically connected to the PLC.

3. The cordless spring-system curtain inspection device according to claim 2, wherein two sides of the clamping mounting plate are each fixed to a downward support plate, the clamping sliding platform comprises a sliding bottom plate, the sliding bottom plate is provided with two vertical plates respectively corresponding to the two downward support plates, and each of the two downward support plates is connected to a respective one of the two vertical plates via a guide assembly.

4. The cordless spring-system curtain inspection device according to claim 3, wherein the lower-beam position-inspecting mechanism comprises an infrared sensor disposed above the clamping groove; a transmission end and a reception end of the infrared sensor are respectively mounted on a sensor mounting brackets on two sides of the clamping groove; the respective sensor mounting bracket is disposed on a respective one of the two vertical plates and adjustable with the respective vertical plate in a vertical position, so as to adjust a height of the infrared sensor; and an upper surface of the clamping drive mechanism is fixed to a top mounting plate, and the position of the top mounting plate corresponding to the clamping groove is provided with an avoidance hole allowing a clamped member on the lower beam of the curtain to enter the clamping groove below.

5. The cordless spring-system curtain inspection device according to claim 1, wherein the lower-beam lifting drive mechanism comprises a clamping lifting stepmotor disposed on the test stand, the clamping lifting stepmotor drives a clamping synchronization-belt wheel disposed on the test stand to rotate, and the clamping synchronization-belt wheel drives a clamping synchronization belt to move up and down; the clamping synchronization belt is fixed to a clamping synchronization block, and the clamping sliding platform is fixed to the clamping synchronization block; and the clamping lifting stepmotor is electrically connected to the PLC.

6. The cordless spring-system curtain inspection device according to claim 1, wherein the test stand is provided with an upper beam configured to connect a curtain mounting frame at an upper end of the curtain, and the upper beam is driven by an upper-beam lifting drive mechanism on the test stand to ascend and descend on the test stand.

7. The cordless spring-system curtain inspection device according to claim 1, wherein the test stand is provided with an upper beam configured to connect a curtain mounting frame at an upper end of the curtain, and the upper beam is driven by an upper-beam lifting drive mechanism on the test stand to ascend and descend on the test stand, and wherein the upper-beam lifting drive mechanism comprises a lifting servo motor disposed on the test stand, the lifting servo motor drives an output shaft to rotate, upper synchronization-belt wheels are respectively disposed at two ends of the output shaft, and each upper synchronization-belt wheel drives, via a synchronization belt, a lower synchronization-belt wheel below to rotate; the synchronization belts on two sides are respectively fixed to synchronization blocks, and two ends of the lower beam are respectively fixed to the synchronization blocks; two sides of the test stand are each further provided with an upper-beam lifting guide rail, and the synchronization block is slidably disposed on the upper-beam lifting guide rail; and highest and lowest positions of the test stand corresponding to the synchronization blocks are each provided with a limiter.

8. The cordless spring-system curtain inspection device according to claim 7, wherein the test stand is provided with a touchscreen control panel, and the touchscreen control panel is electrically connected to the PLC.

* * * * *